United States Patent
Hanson et al.

(10) Patent No.: US 8,183,513 B2
(45) Date of Patent: May 22, 2012

(54) IN-CELL CURRENT SUBTRACTION FOR INFRARED DETECTORS

(75) Inventors: Charles M. Hanson, Richardson, TX (US); Stephen D. Gaalema, Colorado Springs, CO (US)

(73) Assignee: L-3 Communications Corporatin, New York, NY (US)

( * ) Notice: Subject to any disclaimer, the term of this patent is extended or adjusted under 35 U.S.C. 154(b) by 425 days.

(21) Appl. No.: 12/459,122

(22) Filed: Jun. 26, 2009

(65) Prior Publication Data

US 2010/0001173 A1    Jan. 7, 2010

Related U.S. Application Data

(60) Provisional application No. 61/133,519, filed on Jun. 30, 2008.

(51) Int. Cl.
    *H01J 40/14*    (2006.01)
    *G01J 5/00*    (2006.01)

(52) U.S. Cl. .................... 250/214 R; 250/338.1

(58) Field of Classification Search ............. 250/214 R, 250/214 A, 338.1–338.4, 339.01, 339.02
    See application file for complete search history.

(56) References Cited

U.S. PATENT DOCUMENTS

| | | | |
|---|---|---|---|
| 4,404,525 A | 9/1983 | Amir et al. | 330/9 |
| 4,889,985 A * | 12/1989 | Allsop et al. | 250/214 A |
| 4,967,082 A * | 10/1990 | Cooke et al. | 250/338.3 |
| 5,128,534 A | 7/1992 | Wyles | 250/208.1 |
| 6,040,568 A | 3/2000 | Caulfield et al. | 250/208.1 |
| 6,147,340 A | 11/2000 | Levy | 250/214 R |
| 6,384,413 B1 | 5/2002 | Pain | 250/330 |
| 6,849,845 B2 | 2/2005 | Lauffenberger et al. | 250/214 SW |
| 6,873,359 B1 | 3/2005 | Kozlowski et al. | 348/241 |
| 7,015,742 B2 | 3/2006 | Ke | 327/337 |
| 7,148,727 B2 | 12/2006 | Van Bogget | 327/77 |
| 7,268,607 B2 | 9/2007 | Brady, III et al. | 327/337 |
| 2003/0224740 A1 | 12/2003 | Takano et al. | 455/102 |

\* cited by examiner

*Primary Examiner* — Thanh X Luu

(74) *Attorney, Agent, or Firm* — O'Keefe, Egan, Peterman & Enders, LLP

(57) ABSTRACT

Read-out cell systems are disclosed for image detectors, including infrared image detectors, that provide improved sensitivity by providing in-cell subtraction through the use of a voltage ramp signal generated using a reference pixel and a feedback amplifier. The ramp voltage is generated using a reference pixel and an amplifier having feedback. The ramp voltage is then provided to a plurality of read-out cells. The ramp voltage can be coupled to an input transistor to provide current subtraction prior to the integration node. The ramp voltage can also be provided to integration capacitors within the read-out cells to provide current subtraction directly to the integration node. Further, a temperature-independent fixed current source can also be utilized to further control current subtraction.

25 Claims, 4 Drawing Sheets

IN-CELL CURRENT SUBTRACTION FOR INFRARED DETECTORS

RELATED APPLICATIONS

This application claims priority to the following provisional application: Provisional Application SN 61/133,519, which was entitled "IN-CELL CURRENT SUBSTRATION FOR INFRARED DETECTORS" and was filed on Jun. 30, 2008.

TECHNICAL FIELD OF THE INVENTION

This invention relates to bolometer arrays and, more particularly, to the sensitivity of readout cells in bolometer arrays.

BACKGROUND

For a bolometer array, a dominant factor that limits the sensitivity and dynamic range of the bolometer array, such as might be used for thermal imaging, is the offset current (or voltage) that is present even in the absence of a signal. That is, current flows through a resistor regardless of whether there is an infrared signal present, and that current is very large compared to the small differential currents that result from exposure to typical infrared signals. Readout electronics typically integrate the current that flows through each bolometer element, thereby converting the current to a voltage. Every electronic circuit has limitations on the size of voltage it can handle, and because of these voltage size limitations, the offset current effectively limits the voltage range available for signal.

Most of the offset current can be removed by adding another resistor of approximately equal value in series with each bolometer resistor, and then setting the voltages at the bias and ground nodes such that the node between the two resistors (the signal node) is at an appropriate intermediate value. The voltage at the signal node can then swing up or down accordingly as the bolometer resistance decreases or increases. However, the addition of a resistor adds noise, and there is often insufficient space in the pixel unit cell to add a resistor. Furthermore, if a resistor were added it would have to be fabricated in a different process than the bolometer resistors, because they occur on different levels of the integrated circuit structure. This would add to the difficulty in matching resistor values as well as values of their temperature coefficients of resistance, and it would complicate the fabrication process.

U.S. Pat. No. 5,128,534 provides one solution to this problem by adding a ramp current to the backside of a capacitor within the pixel read-out circuitry that acts to subtract charge from the integration capacitor. U.S. Pat. No. 7,268,607 provides another solution having a subtraction of a fixed charge. U.S. Pat. Nos. 5,128,534 and 7,268,607 are hereby each incorporated by reference in its entirety.

FIG. 1 (Prior Art) is a circuit diagram of an embodiment 100 for a read-out cell including current subtraction that relates to U.S. Pat. No. 5,128,534. A bias voltage $V_{det}$ is applied to the common node of the bolometer resistor ($R_{det}$) 102, and a voltage $V_{gg}$ is applied to the gate of a MOSFET (metal oxide semiconductor field effect transistor) 104 operating in saturation. The bias voltage across the resistor is $V_{det}-(V_{gg}+V_T)$, where $V_T$ is the bias transistor threshold voltage. To end an integration cycle, the switch 106 is closed, thereby grounding node 107. To begin the next cycle, the switch 106 is opened, thereby allowing charge to build up on $V_{int}$ node 107 and to be stored on integration capacitor ($C_{int}$) 108. Essentially simultaneously with the opening of the switch, the ramp voltage ($V_{ramp}$) 110 is set to $V_0$ from which point it ramps linearly downward toward ground (0 volts).

While these prior solutions improve bolometer array sensitivity, further improved solutions are still needed to better improve the sensitivity of infrared bolometer arrays.

SUMMARY OF THE INVENTION

Read-out cell systems are disclosed for image detectors, including infrared image detectors, that provide improved sensitivity by providing in-cell current subtraction through the use of a voltage ramp signal generated using a reference pixel and a feedback amplifier. The ramp voltage is then provided to a plurality of read-out cells. The ramp voltage can be coupled to an input transistor to provide current subtraction prior to the integration node. The ramp voltage can also be provided to integration capacitors within the read-out cells to provide current subtraction directly to the integration node. In addition, the ramp voltage can be temperature dependent so that the current subtracted can track the temperature dependence of the offset currents. Further, a temperature-independent fixed current source can also be utilized to increase or decrease the current subtraction. As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Methods and systems are disclosed that provide in-cell current subtraction for infrared detectors that significantly improves the sensitivity of read-out cells within infrared bolometer arrays.

As described herein, a voltage ramp is applied to the backside of a capacitor, the front side of which is connected to the signal node in each of the readout electronics pixel unit cells. This capacitor may be the integration capacitor, but it may also (or instead) be a separate capacitor. Still further, the voltage ramp may be generated by bolometer elements that are not viewing the scene, for example, by inverting their signals as they integrate. A further preferred variation includes a current-subtracting capacitor that subtracts current prior to its reaching the integration node.

Removal of the offset current in a bolometer, as described herein, is an important improvement that has never before been achieved in a continuously-biased bolometer array. This invention is useful for all bolometer arrays for all applications, and it is useful for infrared photon detectors as well.

Embodiments for the present invention will now be discussed with respect to FIG. 2, FIG. 3, FIG. 4, and FIG. 5.

Figure 1:
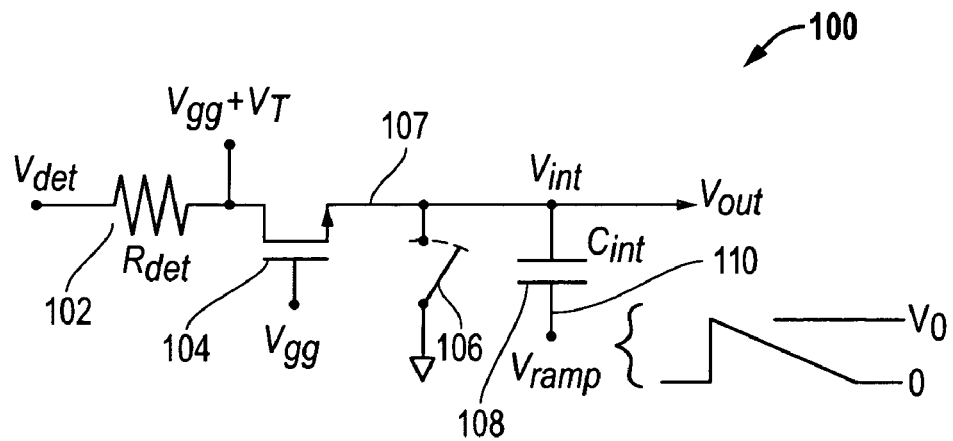
FIG. 1 (Prior Art) is a circuit diagram for a read-out cell including current subtraction.
Figure 2:
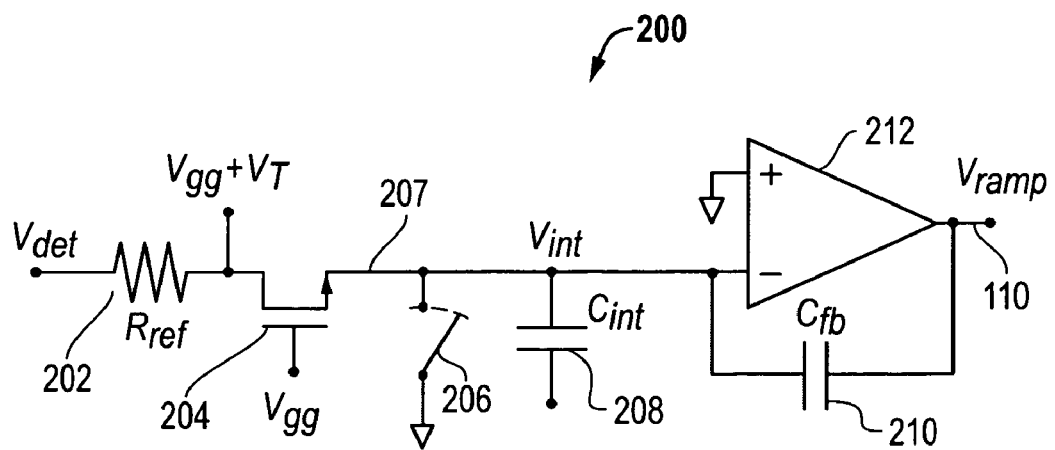
FIG. 2 is a circuit diagram for a ramp generation circuit.

FIG. 2 is a circuit diagram of an embodiment 200 for a ramp generation circuit. This ramp generation circuit is some respects is similar to the read-out cell of FIG. 1 (prior art). However, unlike the embodiment 100 of FIG. 1 (prior art), this ramp circuit embodiment 200 utilizes a reference voltage from a reference pixel ($R_{ref}$) 202 that does not receive scene energy but receives an ambient or background temperature. In addition, an amplifier 212 has been added between the $V_{int}$ node 207 and the $V_{ramp}$ output node 110. The negative ("−") input of the amplifier 212 is coupled to the $V_{int}$ node 207, and the positive ("+") input is connect to ground. The reference pixel or resistor ($R_{ref}$) 202 is essentially identical to a bolometer resistor ($R_{det}$) 102 except that it is not exposed to scene energy. Although if desired, the reference resistor ($R_{ref}$) 202 can be exposed to a blurred scene that represents the average scene radiance.

In operation, current flows through the reference resistor ($R_{ref}$) 202 and the bias transistor (M1) 204 and accumulates on the integration capacitor ($C_{int}$) 208. The bias transistor 204 serves to maintain at a constant value the voltage at the node between resistor 202 and bias transistor 204, even as the voltage on integration capacitor ($C_{int}$) 208 changes. For bias transistor 204 to function in this manner, the current flowing through it must be sufficient to maintain the bias transistor in a state of saturation. To start a cycle, switch 206 is opened to allow charge to build upon $V_{int}$ node 207 and be stored by integration capacitor ($C_{int}$) 208. To end a cycle, the switch 206 is closed to drive $V_{int}$ node 207 to ground. The voltage on $V_{int}$ node 207 is applied to amplifier 212, as described above, and the ramp output voltage ($V_{ramp}$) on node 110 is provided to detection cells as described further with respect to FIG. 3 below. It is noted that the integration capacitor ($C_{int}$) 208 can be coupled between the $V_{int}$ node 207 and ground or some other desired reference node.

A feedback capacitor ($C_{fb}$) 204 is coupled between the $V_{ramp}$ node 110 and the negative ("−") input to the amplifier 212. The feedback capacitor ($C_{fb}$) 204 may be used in place of the integration capacitor ($C_{int}$) 208, if desired, or it may supplement it, as shown in FIG. 2. If the feedback capacitor ($C_{fb}$) 204 is used in place of the integration capacitor ($C_{int}$) 208, then the integration capacitor ($C_{int}$) 208 is simply removed in embodiment 200 leaving only the feedback capacitor ($C_{fb}$) 204. In addition, there may be more than one resistor and transistor combination feeding current to the $V_{int}$ node 107. Alternatively, there may be more than one resistor and a single transistor sized to accommodate the current from all the resistors. As depicted, transistor 104 and reference resistor ($R_{ref}$) 202 are being used to feed current to the $V_{int}$ node 207. Further, it is noted that the number of reference resistors and the value of the effective integration capacitance should be balanced to produce a current subtraction such that the integrated voltages from the imaging pixels are at the most desireable level.

Figure 3:
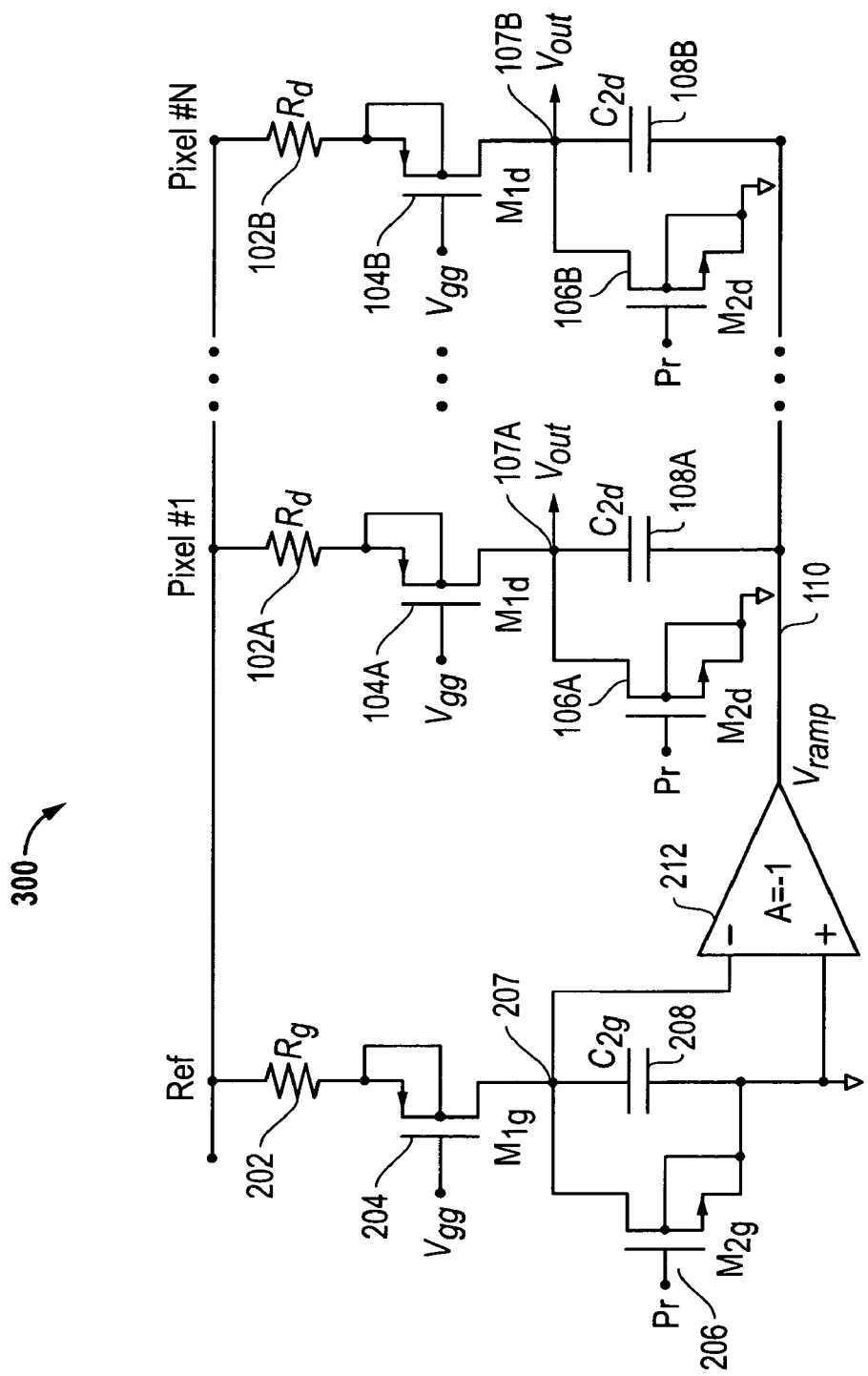
FIG. 3 is a circuit diagram showing a ramp generator operating with a plurality of imaging pixels.

FIG. 3 is a circuit diagram of an embodiment 300 showing a ramp generator operating with a plurality of imaging pixels. The resistor $R_g$ 202 represents a reference bolometer resistance that is not exposed to radiant energy from the scene, but rather is exposed to a source near ambient temperature. Alternatively, as indicated above, the resistor $R_g$ 202 can be exposed to a blurred image of the scene in order for the incident energy to be an average scene radiance. As depicted, the voltage ramp ($V_{ramp}$) output 110 is provided to a plurality of N pixels including Pixel #1 . . . Pixel #N. It is noted that the $V_{det}$ line at the top of FIG. 3 represents a bias voltage provided to the reference pixel/resistor $R_g$ 202 and the plurality of detector pixels/resistors ($R_d$) 102A . . . 102B for the plurality of N pixels.

It is noted that for the plurality of pixel detectors Pixel #1 . . . Pixel #N, the circuits of FIG. 1 (prior art) repeat. As such, these common elements are referred to with the A/B designation with respect to the element numbering in FIG. 1 (prior art). It is further noted that for embodiment 300, switch 106 and switch 206 have been indicated as transistor ($M_{2g}$) 206, transistor ($M_{2d}$) 106A . . . and transistor ($M_{2d}$) 106B that receive a preset (Pr) signal.

Figure 4:
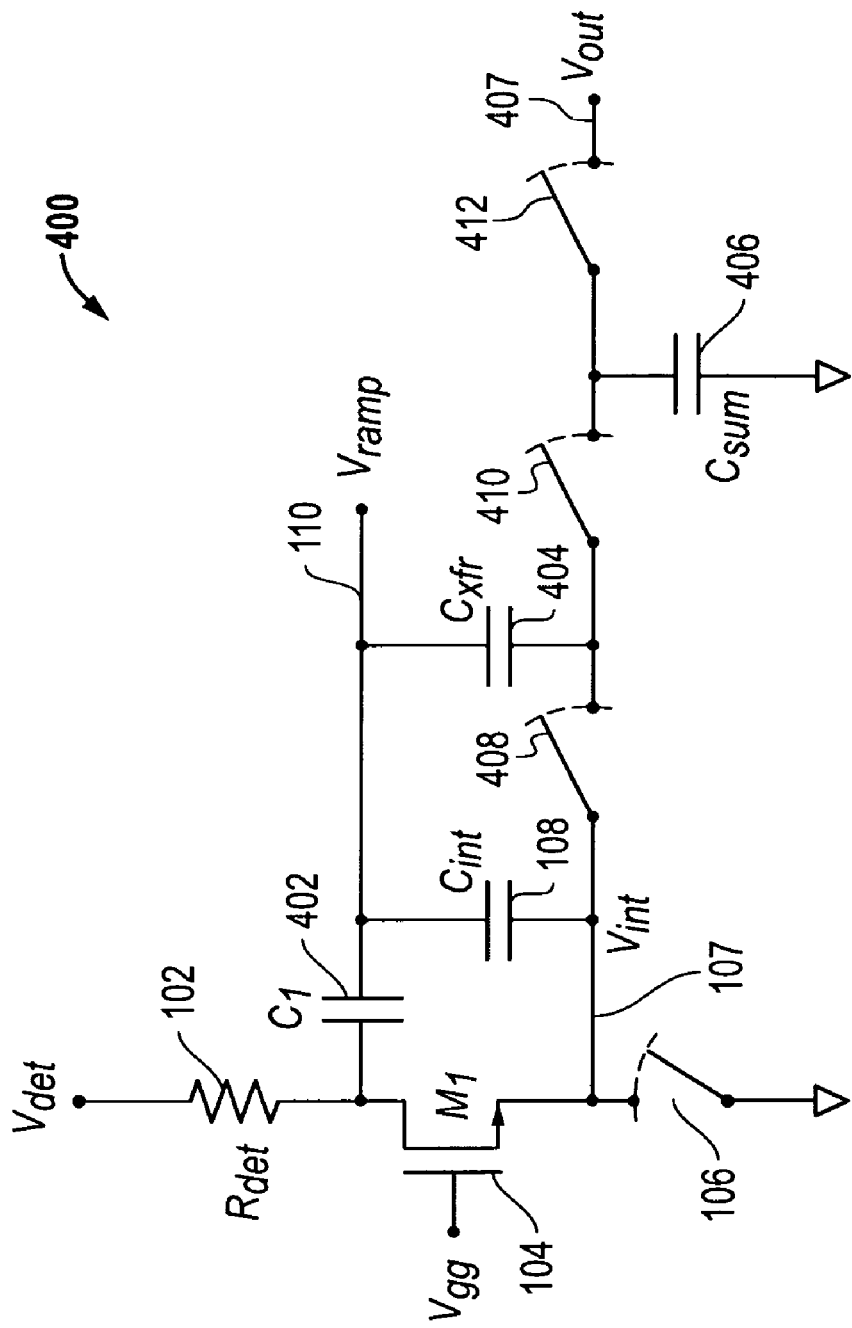
FIG. 4 is a circuit diagram for a read-out cell including an additional pre-integration current subtraction.

FIG. 4 is a circuit diagram of an embodiment 400 for a read-out cell including an additional pre-integration current subtraction through the use of a subtraction capacitor ($C_1$) 402. In this preferred configuration, subtraction capacitor ($C_1$) 402 is coupled to the input node for the transistor 104 (the output node for the transistor 104 is the integration node 107). This subtraction capacitor ($C_1$) 402 provides current subtraction in addition to that provided by the ramp current ($V_{ramp}$) 110 on the integration capacitor $C_{int}$ 108 The addition of a switched-capacitor, implemented by transfer capacitor ($C_{xfr}$) 404 and summation capacitor ($C_{sum}$) 406 along with switches 408, 410 and 412, is optional to produce the voltage output ($V_{out}$) at node 407 rather than node 107, as in FIG. 1 (prior art). In addition, it is noted that $C_{xfr}$ and $C_{int}$ may alternatively be connected to ground instead of to $V_{ramp}$. It is further noted that other than the addition of the subtraction capacitor ($C_1$) 402, the circuit embodiment 400 is otherwise similar to the circuit embodiment 100 of FIG. 1 (prior art).

The introduction of the subtraction capacitor ($C_1$) 402 provides significant advantages. The value of $C_1$ and the value of $V_{ramp}$ can be set so that the current through the MOSFET ($M_1$) 104 remains sufficient to saturate $M_1$, thereby keeping the voltage across $R_{det}$ constant during integration. This configuration is advantageous at least in part because the additional subtraction capacitor ($C_1$) 402 operates to subtract current prior to the transistor M1 104 and thereby prior to integration. As such, the integration capacitor ($C_{int}$) 108 has significantly improved sensitivity for the read-out cell.

It is further noted that the advantage of employing capacitor $C_1$ 402 is that it enables use of a larger current-subtracting capacitor without affecting the gain. If instead, the size of $C_{int}$ 108 were increased to increase current subtraction, the voltage change resulting from a small change in detector current would be reduced. Further, if $C_1$ 402 were placed on the same side of $M_1$ 104 as $C_{int}$ 108, the same degrading effect would result, because $C_1$ 402 and $C_{int}$ 108 would then be in parallel, and the presence of $C_1$ 402 would be indistinguishable from an equivalent increase in $C_{int}$ 108.

In the embodiments addressed so far, the current-subtraction circuit can only subtract a large fraction of the background current, and that fraction remains approximately constant as the ambient temperature changes. The amount of current subtracted must be less than the least current generated by any pixel in the array. Otherwise, the net current from some pixels would be negative. Furthermore, the subtracted current must be substantially less than the least current. Otherwise, the net current would not be sufficient to maintain bias transistor M1 in saturation, and the bias voltage across the detector pixel would not remain constant during integration. This means that a substantial fraction of the offset current remain, and this offset current will still vary considerably as the ambient temperature varies.

Figure 5:
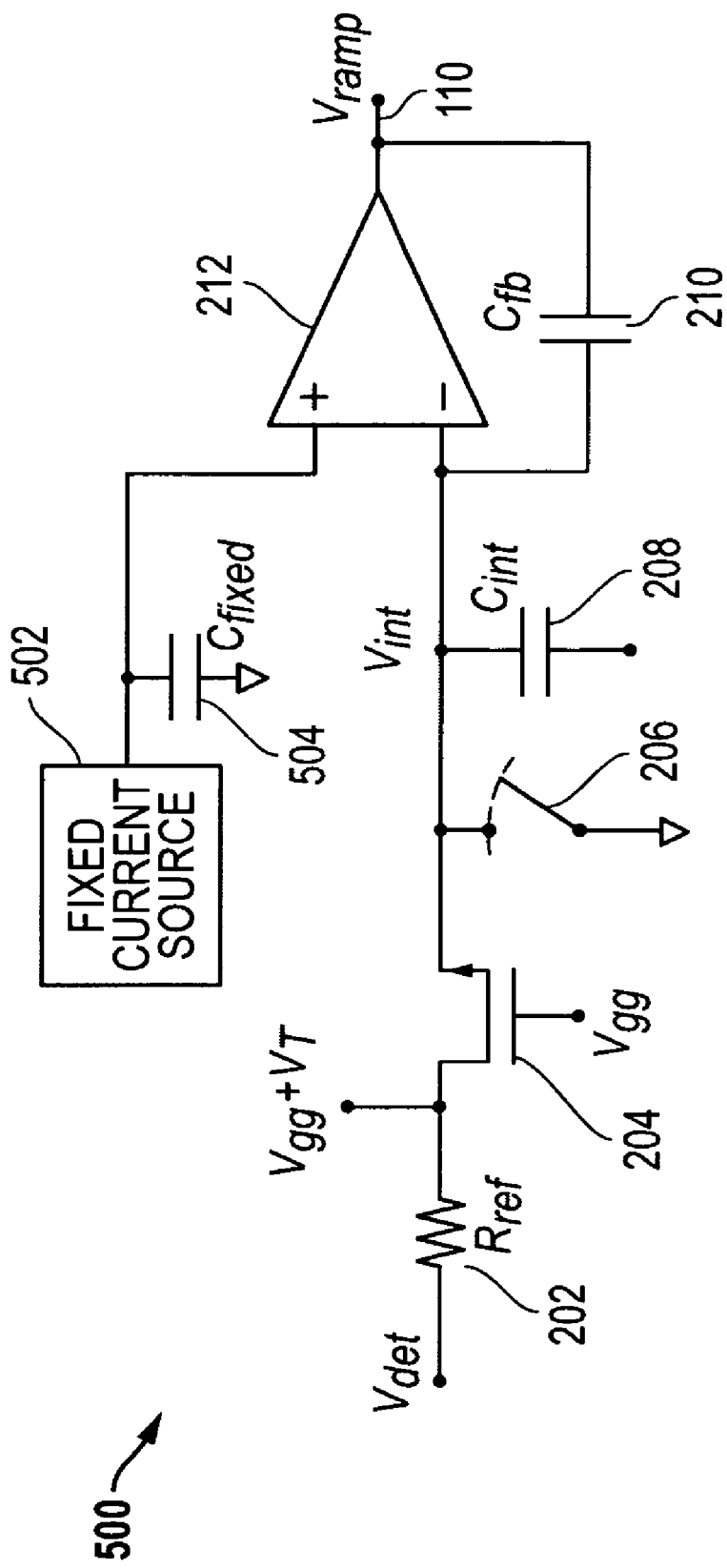
FIG. 5 is a circuit diagram for an alternative ramp generation circuit that includes the addition of a fixed current source.

FIG. 5 is a circuit diagram of an embodiment 500 for an alternative ramp generation circuit. More particularly, this alternative embodiment includes the addition of a temperature-independent fixed current source 502 and another integrating capacitor ($C_{fixed}$) at the positive ("+") input of the amplifier 212 in the ramp generator of FIG. 2. The amplitude of the ramp created by reference pixels is adjusted (e.g., by adjusting the values of $C_{int}$ 208, $C_{fb}$ 210, and/or the amplitude of the temperature-dependent current source from transistor 204) so that the current subtracted without the temperature-independent fixed current source 502 is equal to the average current generated by the active pixels. Thus, the net average current after subtraction is approximately zero. The amplitude of the temperature-independent fixed current source 502 is then set by adjusting the amplitude of the fixed current source 502 and the value of the additional capacitor ($C_{fixed}$) so that the average net pixel current is such that the integrated voltage of each active pixel is approximately at the midpoint of the voltage range. Thus, the average net pixel current is approximately independent of ambient temperature, provided the temperature-dependent current source 502 has the same temperature dependence as the active pixels. The temperature dependence of the pixel-to-pixel offsets will therefore be proportional only to the difference between the nominal offsets from the average pixel current.

In operation, this embodiment 500 of FIG. 5 has the effect of minimizing the ambient temperature dependence of the net integrated voltage of each pixel, thereby easing the design requirements for the pixel interface circuitry and increasing the voltage range available for signal. This additional voltage range can be used for improved dynamic range, or, by increasing either the integration time or the pixel bias voltage, improved sensitivity. Because the temperature-dependent offsets are much smaller, the accuracy of the temperature-dependence of the correction coefficients becomes much less. Finally, if the temperature-independent fixed current source 502 is sufficiently independent of temperature, and if the temperature-dependent current adequately mimics that of the active pixels, then this obviates the use of feedback to control integration time. At the same time, it provides the opportunity to maximize the integration time, thereby maximizing signal while minimizing noise bandwidth.

It is noted that the added temperature-independent fixed current source 502 could alternatively be placed at the output of the amplifier 212. It is further noted that the polarity of the temperature-independent fixed current source 502 could be reversed and placed at the negative ("−") input of the amplifier 212.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A read-out cell system for image detectors, comprising:
    a ramp voltage generator, comprising:
        an integration node coupled to a reference pixel, the reference pixel being coupled to a bias voltage;
        an amplifier coupled to the integration node, the output of the amplifier providing a ramp voltage output signal for the ramp voltage generator, the ramp voltage output signal being separate from the bias voltage; and
        a feedback capacitor coupled between the output of the amplifier and an input of the amplifier; and
    a plurality of read-out cells coupled to the ramp voltage output signal to provide in-cell current subtraction based upon the ramp voltage output signal, each read-out cell having a detector pixel coupled to the bias voltage.

2. The read-out cell system of claim 1, further comprising an integration capacitor coupled to the integration node within the ramp voltage generator.

3. The read-out cell system of claim 1, wherein the plurality of read-out cells each comprise:
    an integration node coupled to the detector pixel; and
    an integration capacitor coupled to the integration node and to the ramp voltage output signal.

4. The read-out cell system of claim 3, wherein the integration node for each of the plurality of read-out cells is coupled to the detector pixel through a transistor.

5. The read-out cell system of claim 1, wherein the plurality of read-out cells each comprise:
    an integration node coupled to the detector pixel;
    a transistor having an input node and an output node, the input node being coupled to the detector pixel and the output node being coupled to the integration node;
    an integration capacitor coupled to the integration node; and
    a subtraction capacitor coupled between the input node for the transistor and the ramp voltage output signal.

6. The read-out cell system of claim 5, wherein the integration capacitor is also coupled to the ramp voltage output signal.

7. The read-out cell system of claim 5, wherein the integration capacitor is also coupled to ground.

8. The read-out cell system of claim 1, wherein the amplifier has a positive input and a negative input, wherein the integration node is coupled to the negative input, and wherein the feedback capacitor is coupled between the output and the negative input.

9. The read-out cell system of claim 8, wherein the positive input is coupled to ground.

10. The read-out cell system of claim 8, further comprising a temperature-independent fixed current source coupled to the positive input or the negative input or the output of the amplifier.

11. The read-out cell system of claim 10, further comprising an integration capacitor coupled to the temperature-independent fixed current source.

12. The read-out cell system of claim 1, wherein the reference pixel is configured not to be exposed to scene energy.

13. The read-out cell system of claim 1, wherein the reference pixel is configured to be exposed to a blurred scene that represents average scene radiance.

14. A method for reading-out cells for image detectors, comprising:
    receiving a signal from a reference pixel, the reference pixel being coupled to a bias voltage;
    amplifying the signal to generate a ramp voltage output signal, the ramp voltage output signal being separate from the bias voltage;
    providing feedback for the amplifying step utilizing a feedback capacitor; and
    applying the ramp voltage output signal to the plurality of read-out cells to provide in-cell current subtraction based upon the ramp voltage output signal, each read-out cell having a detector pixel coupled to the bias voltage.

15. The method of claim 14, further comprising integrating the signal from the reference pixel using an integration capacitor.

16. The method of 14, further comprising, for each of the plurality of read-out cells, integrating a signal from the detector pixel using an integration capacitor coupled to the ramp voltage output signal.

17. The method of claim 16, further comprising providing the signal from the detector pixel to the integration capacitor through a transistor.

18. The method of claim 14, further comprising, for each of the plurality of read-out cells, providing a transistor having an input node and an output node, providing the ramp voltage output signal to the input node for the transistor through a subtraction capacitor, also providing a signal from the detector pixel to the input node for the transistor, and using an integration capacitor to integrate a signal at the output node for the transistor.

19. The method of claim 18, further comprising also coupling the integration capacitor to the ramp voltage output signal.

20. The method of claim 18, further comprising also coupling the integration capacitor to ground.

21. The method of claim 14, wherein the amplifying step comprises using an amplifier having a positive input and a negative input, coupling the reference node to the negative input, and coupling the feedback capacitor between the amplifier output and the negative input.

22. The method of claim 21, further comprising coupling the positive input to ground.

23. The method of claim 21, further comprising coupling the positive input or the negative input or the output of the amplifier to a temperature-independent fixed current source.

24. The method of claim 14, further comprising not exposing the reference pixel to scene energy.

25. The method of claim 14, further comprising exposing the reference pixel to a blurred scene that represents average scene radiance.

* * * * *